(12) United States Patent
Röhrl et al.

(10) Patent No.: US 6,211,776 B1
(45) Date of Patent: Apr. 3, 2001

(54) METHOD FOR INITIALIZING AN ANTI-THEFT SYSTEM FOR A MOTOR VEHICLE

(75) Inventors: Thomas Röhrl, Barbing; Manfred Glehr, Neutraubling, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/263,330

(22) Filed: Mar. 5, 1999

(30) Foreign Application Priority Data

Mar. 5, 1998 (DE) .............................................. 198 09 433

(51) Int. Cl.$^7$ ..................................................... B60R 25/10

(52) U.S. Cl. ........................ 340/426; 340/430; 340/425.5; 340/428; 340/539; 340/825.31; 340/825.69

(58) Field of Search ................................. 340/426, 425.5, 340/428, 430, 825.69, 825.31, 825.72, 825.57, 539, 514, 10.1, 10.4

(56) References Cited

U.S. PATENT DOCUMENTS

| | | | |
|---|---|---|---|
| 5,815,087 | * | 9/1998 | Campbell et al. .............. 340/825.54 |
| 5,966,083 | * | 10/1999 | Marsh et al. ..................... 340/825.54 |
| 6,064,296 | * | 5/2000 | Clancy et al. ...................... 340/10.1 |
| 6,100,603 | * | 8/2000 | Gold ..................................... 340/539 |

FOREIGN PATENT DOCUMENTS

3820248A1 * 1/1989 (DE) .

* cited by examiner

*Primary Examiner*—Jeffery Hofsass
*Assistant Examiner*—Hung Nguyen
(74) *Attorney, Agent, or Firm*—Herbert L. Lerner; Laurence A. Greenberg; Werner H. Stemer

(57) ABSTRACT

An interrogation signal is emitted via one or more passenger compartment antennas of a motor vehicle. The transmit power of the emitted interrogation signal is changed until a portable transponder just still receives the interrogation signal if the transponder is located at a previously defined, fixed position. The transmit power which is set in this way is stored for the operation of the anti-theft system.

9 Claims, 5 Drawing Sheets

METHOD FOR INITIALIZING AN ANTI-THEFT SYSTEM FOR A MOTOR VEHICLE

BACKGROUND OF THE INVENTION

Field of the Invention

The invention relates to a method for initializing an anti-theft system for a motor vehicle. The anti-theft system has a transceiver unit disposed in the motor vehicle that transmits interrogation signals via an antenna. The interrogation signals are received by a portable response transmitter which in turn responds by transmitting a response signal back to the transceiver. The transceiver in turn evaluates the response signal.

A known anti-theft system has an antenna device in the driver's door and is described in Published, Non-Prosecuted German Patent Application DE 38 20 248 A1. If a user wishes to get into the vehicle, an interrogation/response dialog is triggered by activating a trigger circuit. In the process, an interrogation signal is transmitted by the antenna device in the vehicle to a response transmitter carried by the user. The response transmitter transmits back an encrypted response signal if it receives the interrogation signal. In the motor vehicle, the response signal is compared with an expected setpoint signal and if the two correspond (successful authentication), the doors are locked or unlocked.

The same interrogation/response dialog also takes place in the motor vehicle when the user wishes to start the vehicle. After the ignition switch is activated, an interrogation signal is emitted and a response signal is subsequently transmitted back. If the response signal is authorized, the immobilizer is deactivated.

In such an anti-theft system, the range of the interrogation signal may be too low, so that the response transmitter cannot receive the interrogation signal. The range of the interrogation signal may also be too large and other response transmitters located in the vicinity may be addressed in error (overshoot). When attempting to release the immobilizer it is particularly important that only one response transmitter in the vicinity of the vehicle or in the interior of the vehicle is addressed, even if the response transmitter is stored, for example, far from the ignition lock in the side compartment in the interior of the vehicle. If the response transmitter cannot receive the interrogation signal, the user cannot get into his motor vehicle and cannot start his motor vehicle either.

SUMMARY OF THE INVENTION

It is accordingly an object of the invention to provide a method for initializing an anti-theft system for a motor vehicle that overcome the above-mentioned disadvantages of the prior art devices and methods of this general type, in which signals are emitted by a vehicle-mounted transmitter, while the anti-theft system is operating, such that the signals can reliably be received by a portable response transmitter located at a defined distance from the motor vehicle.

With the foregoing and other objects in view there is provided, in accordance with the invention, a method for initializing an anti-theft system, which includes: a) setting an initial transmit condition; b) emitting an interrogation signal via a transceiver unit disposed in a motor vehicle and electrically connected to at least one antenna disposed on the motor vehicle; c) receiving the interrogation signal in a portable response transmitter located at a previously defined fixed position and emitting a response signal in response to the interrogation signal; d) receiving, evaluating, and comparing the response signal in a control unit of the transceiver unit with setpoint values; e) changing the initial transmit condition according to a predefined algorithm in dependence on the response signal received; and f) repeating steps b)–e) until the portable response transmitter just still receives the interrogation signal or just fails to receive the interrogation signal any more.

During the initialization, a transceiver unit repeatedly emits an interrogation signal systematically according to a predefined algorithm with changed transmit conditions until the response transmitter just still receives an interrogation signal. If the position of the response transmitter is fixed during the initialization, the maximum range of the signals can thus reliably be set precisely in accordance with the immediate area outside the vehicle or to the passenger compartment of the vehicle. In this way, the response transmitter reliably receives the interrogation signal as soon as it is located in the vicinity of the motor vehicle or within the motor vehicle.

The transmit conditions under which, given the setting conditions during the initialization, a response signal is just still received by the transceiver unit can thus be stored, as future transmit conditions, in a memory. Interrogation signals are emitted at a later time using these transmit conditions. The transmit power of the transmitter in the transceiver unit, on the basis of which the range of the signals is determined, is preferably used as transmit conditions.

The antennas that are used are electrical coils that are disposed distributed on or in the motor vehicle. As a result, individual antennas do not need an excessively large transmit power. During the initialization, the transmit conditions can be changed incrementally or continuously within a predefined range until the response transmitter just still receives the interrogation signal. As a result, the correct transmit conditions are determined quickly. Each response transmitter can emit a code together with the response signal, as a result of which the transmit condition which has just been set can be assigned to the code. As a result, the transceiver unit knows the transmit conditions for each response transmitter.

The response transmitter can also have a measuring device with which the received transmit power is measured. The power can be transmitted, as a measured value, back to the transceiver unit in the motor vehicle. As a result, from the measured power the transceiver unit can calculate how the transmit conditions are to be changed so that the response transmitter just still receives an interrogation signal.

Other features which are considered as characteristic for the invention are set forth in the appended claims.

Although the invention is illustrated and described herein as embodied in a method for initializing an anti-theft system for a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
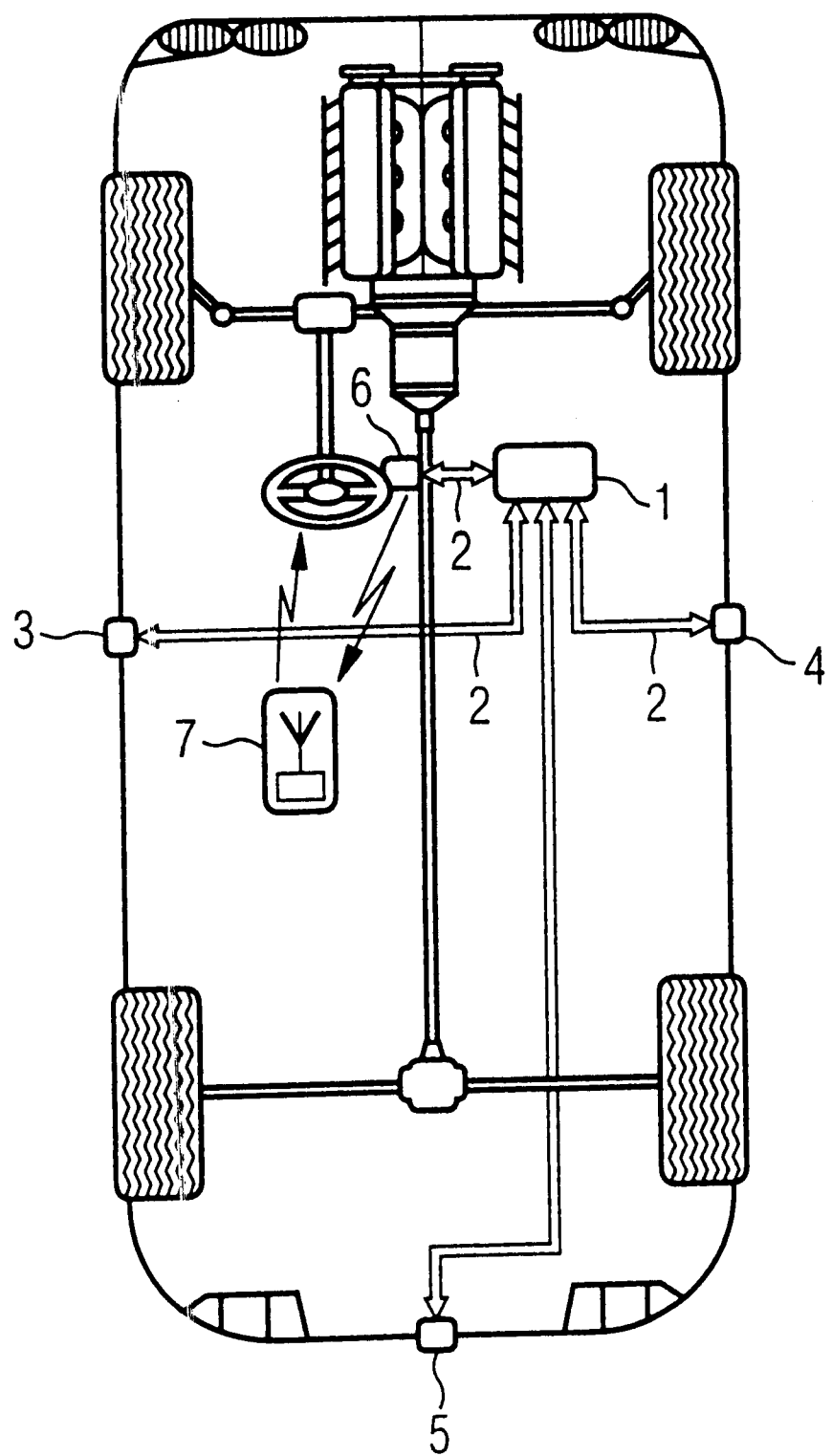
FIG. 1 is a diagrammatic block diagram of an anti-theft system according to the invention.

In all the figures of the drawing, sub-features and integral parts that correspond to one another bear the same reference symbol in each case. Referring now to the figures of the drawing in detail and first, particularly, to FIG. 1 thereof, there is shown an anti-theft system for a motor vehicle that has a transceiver unit 1 in the motor vehicle. The transceiver unit 1 is connected to antennas 3, 4, 5, 6 via lines 2. By way of example, four antennas are represented, specifically a driver door antenna 3, a front seat passenger door antenna 4, a rear-mounted antenna 5 and a passenger compartment antenna 6. The antennas 3, 4, 5 cover, with their directional characteristic, the outside area around the respective door or trunk. The passenger compartment antenna 6 covers, with its directional characteristic, the area around the ignition lock and around the seat of the driver. There may also be a plurality of passenger compartment antennas which all emit an interrogation signal simultaneously or at intervals.

Via the antennas 3, 4, 5 in the doors or trunk, the interrogation signal may also be transmitted both into the passenger compartment and into the area outside the vehicle (the area directly surrounding the motor vehicle).

The transceiver unit 1 transmits signals via the antennas 3, 4, 5, 6 in a wire-free fashion (shown by lightning-type arrows in FIG. 1) to a portable response transmitter 7 (referred to below as a transponder 7), receives signals from the transponder 7 in the wire-free fashion, evaluates them and, after successful evaluation, controls non-illustrated electronic units in the motor vehicle.

Whenever a trigger switch 8 (FIG. 2) is activated, the transceiver unit 1 emits a respective interrogation signal via the antennas 3, 4, 5, 6. If the interrogation signal is received by the portable transponder 7, the transponder 7 transmits back a response signal (this is also referred to as interrogation/response dialog or as challenge and response).

The response signal is received by one of the antennas 3, 4, 5, 6 in the motor vehicle or by another non-illustrated antenna and is fed to the transceiver unit 1 for evaluation. There, the response signal is checked for its authentication, and the contents are evaluated.

Figure 2:
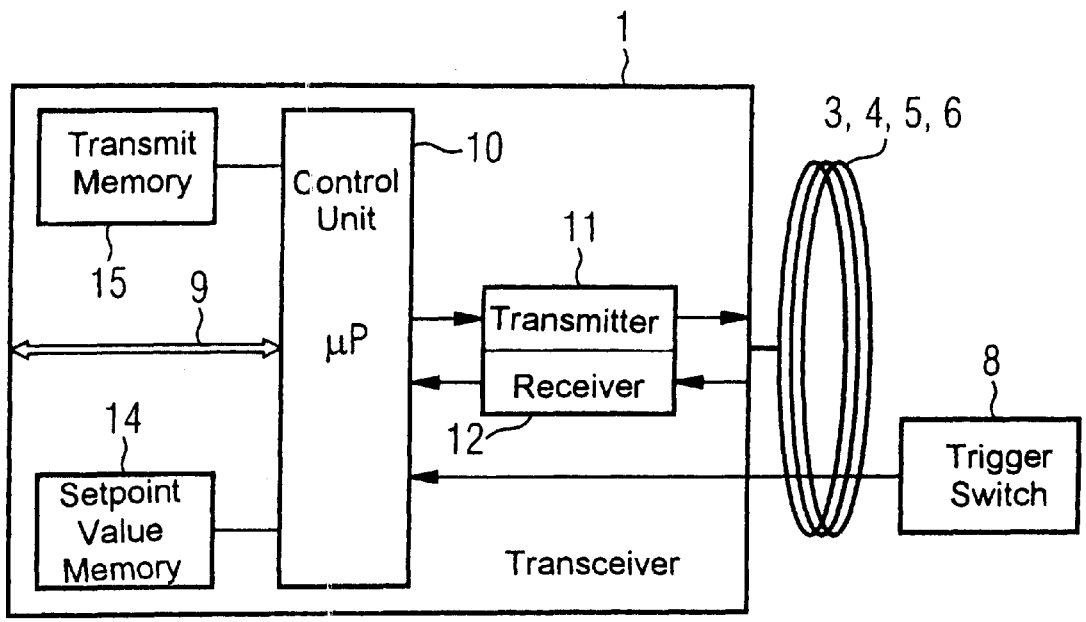
FIG. 2 is a block circuit diagram of a transceiver unit of the anti-theft system according to FIG. 1.

The transceiver unit 1 is connected to door locks, an immobilizer or other electronic control units in the motor vehicle via data or control lines 9 (FIG. 2). If the transponder 7 proves to be authenticated, i.e. the response signal corresponds to an expected setpoint signal, the so-called authentication is successful. Subsequently, depending on the contents of the response signal, one or all of the door locks are locked or unlocked. Likewise, an immobilizer may be released, an internal light may be switched on or off, windows or a sunroof may be opened or closed, a heating/air conditioning system may be switched on or off, seats adjusted, a radio switched on or off, mirrors set to the respective user etc.

For this purpose, the transceiver unit 1 has a control unit 10 (microprocessor uP) which outputs control signals via the data or control lines 9 or a vehicle bus to the corresponding electronic units in the motor vehicle.

In order to initiate the interrogation/response dialog between the motor vehicle and the transponder 7, the interrogation signal must initially be triggered. For this purpose, in the first instance, the transponder 7 may have a trigger circuit (momentary-contact switch) which, when activated, causes a start signal to be transmitted to the motor vehicle, in response to which the interrogation signal is triggered. The trigger circuit 8 can also be disposed on the motor vehicle, for example as an ignition switch or as a door switch, which, when activated, causes the interrogation signal to be emitted.

The interrogation signal is modulated in a transmitter 11 and transmitted via one or more antennas 3, 4, 5, 6. Conversely, one or more of the antennas 3, 4, 5, 6 or one further antenna receives the response signal and passes it on to a receiver 12, where the response signal is demodulated. The receiver 12 passes on the demodulated response signal to the control unit 10, where it is evaluated.

The transceiver unit 1 has a setpoint value memory 14, in which the expected setpoint signal, which is compared with the received response signal, is stored. In addition, a transmit memory 15 is disposed in the transceiver unit 1. Transmit conditions, which have been determined during an initialization of the anti-theft system and which determine the method with which the response signal is emitted, are stored in the transmit memory 15. Thus, for example the carrier frequency, the transmit power or the phase of the signals which are to be emitted are stored there, in comparison with signals which have been emitted with another antenna.

Figure 3:
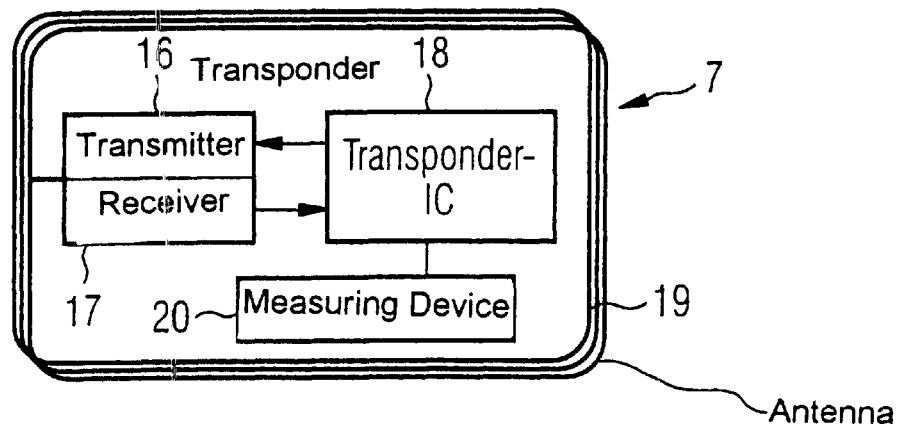
FIG. 3 is a block circuit diagram of a portable response transmitter of the anti-theft system according to FIG. 1.

The transponder 7 (FIG. 3) is advantageously disposed on a card which is the size of a check card, in a key handle or in a key tag. It has a transmitter 16 and a receiver 17 which are connected to a transponder IC 18. An item of user-specific code information, which is protected against unauthorized access, is stored in the transponder IC 18, or such an item of information is generated therein using a mathematical algorithm. The code information is used to encrypt the response code signal. The response signal is then transmitted back if a valid response signal has been received beforehand.

In order to transmit and receive signals, the transponder 7 has an antenna 19 in the form of a coil. With the coil, the signals are transmitted into or received from, one of the antennas 3, 4, 5, 6 of the motor vehicle in an inductive fashion. Instead of inductive transmission of the signals, RF transmission (radio transmission) or optical transmission (IR signal) may also be provided. The antennas are then of appropriate configuration.

Figure 4:
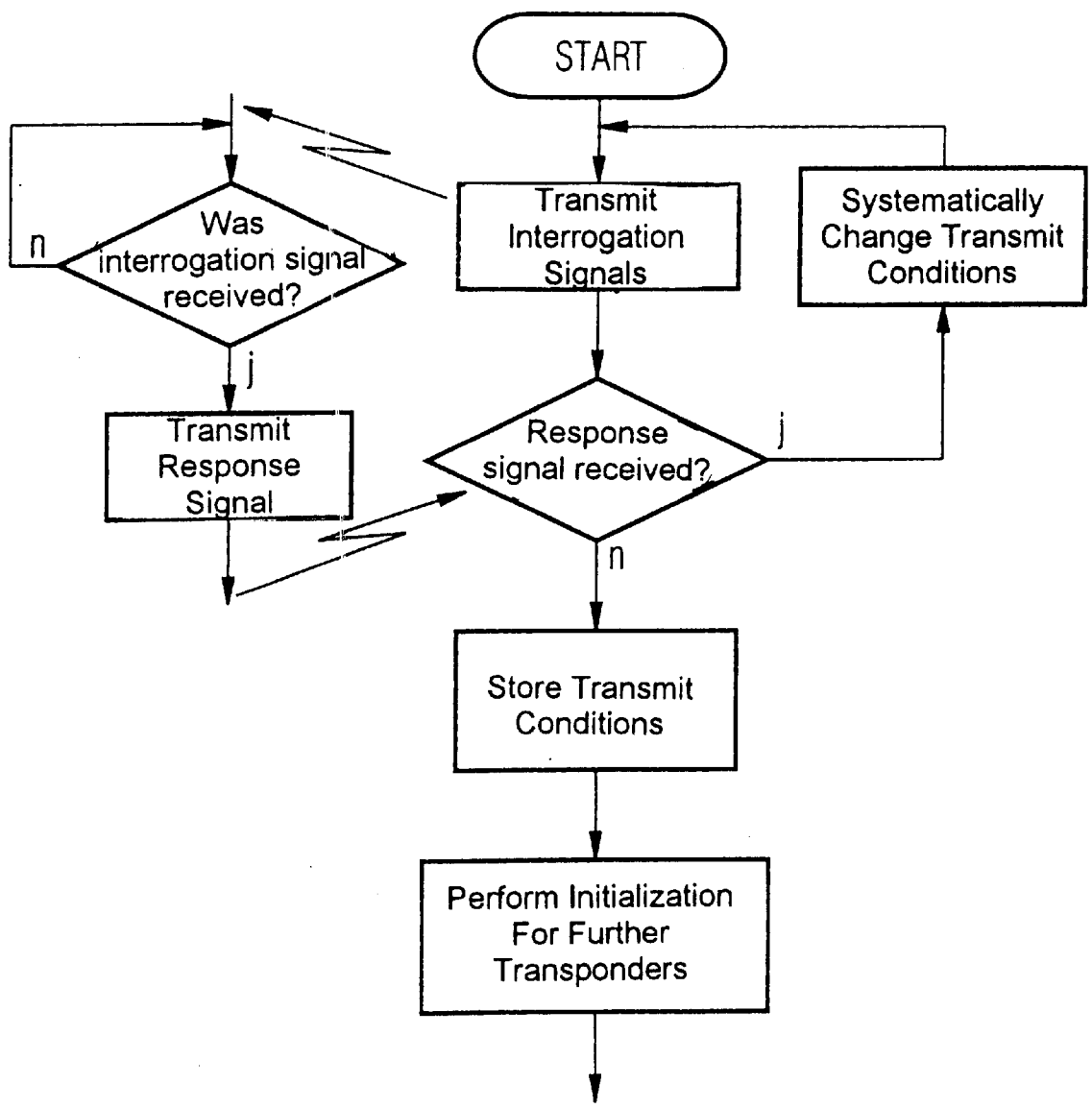
FIG. 4 is a flowchart of an initialization procedure.

It will be explained, with reference to the flowchart in FIG. 4, how the initialization of the anti-theft system, and thus the setting of the transmit conditions, take place. A prerequisite here is that the position of the transponder 7 with respect to the antennas 3, 4, 5, 6 is previously defined and is largely maintained while the transmit conditions are being set.

Initially, an interrogation signal with initially defined values for the transmit conditions is transmitted successively via all the antennas 3–6 by the transceiver unit 1. The transceiver unit 1 subsequently waits for a predetermined time period for a response signal of the transponder 7. If the transponder 7 receives the interrogation signal within this time period, it transmits the response signal back. As long as the response signal is received by the transceiver unit 1, interrogation signals are emitted again and, in the process, the transmit conditions are changed until the response signal is no longer received.

If, after this, the response signal is no longer received, the last transmit condition is stored in the transmit memory 15. As a result, the transceiver unit 1 knows how large the range of the interrogation signal is. If the transponder 7 is located within the range of the antennas during the initialization, it is ensured later when the anti-theft system is being operated that the transponder 7 is reliably addressed as long as it is located within this range.

This method for setting the transmit conditions (initialization) can be carried out separately for each transponder 7 assigned to the anti-theft system. If each transponder 7 has a code ("key number") which is characteristic of it, it can transmit the code back with its response signal. As a result, the transceiver unit 1 detects when, and at which transponder 7, a response signal has come back. It can then store its own, systematically defined transmit conditions for each transponder 7, i.e. for each code.

Typically, the transmit power (current and voltage), and the resulting range of the interrogation signal are used as transmit conditions. The transmit power may be set, for example, by actuating the antennas 3–6 by PMW (pulse width modulated) signals, by phase control, by voltage control or by current control.

The method for initializing is explained in more detail with reference to FIG. 5, for the example of the setting of the range of the interrogation signal of the passenger compartment antenna 6.

The transponder 7 is located in a previously defined position, which remains the same during the initialization, and is on the outside directly on the side window on the driver side or at a predetermined distance from it. The passenger compartment antenna 6 initially emits the interrogation signal with a large range and waits for the response signal.

As long as the response signal is still received, the range is changed incrementally or continuously. As soon as the response signal no longer arrives, the transmit power (resulting range II in FIG. 5) of the passenger compartment antenna 6 is sufficient in order to reliably address a transponder 7 within the vehicle from the passenger compartment antenna 6 later when the anti-theft system has been operating.

Alternatively, the method for setting the range may also be started with a relatively small range. Here, the intention is that it will be certain that no response signal will be transmitted back by the transponder 7. Then, on the basis of this initial value, the transmit power, and thus the range, are systematically increased until a response signal is received by the transponder 7. As a result, the transmit power (and thus the range I in FIG. 5) is known, so that the transponder 7 in the passenger compartment in the vicinity of the driver seat can reliably be addressed during future attempts at starting. The later transmit power must therefore not be much smaller than the transmit power which is determined.

The transponder 7 may also have a measuring device 20 (see FIG. 3) with which the power of the received interrogation signal is measured. This requires that the initial value of the transmit power is large enough and that the directional characteristic of the antennas 3–6 are known. If the measured value of the received power in the response signal is transmitted back to the transceiver unit 1, the transceiver unit 1 can calculate from it, with reference to comparison measurements and taking into account the actually present directional characteristic, a value for the transmit power for which an adequate range of the interrogation signal is then achieved. As a result, the initialization method takes less time, because just one or two interrogation signals have to be emitted.

Figure 6:
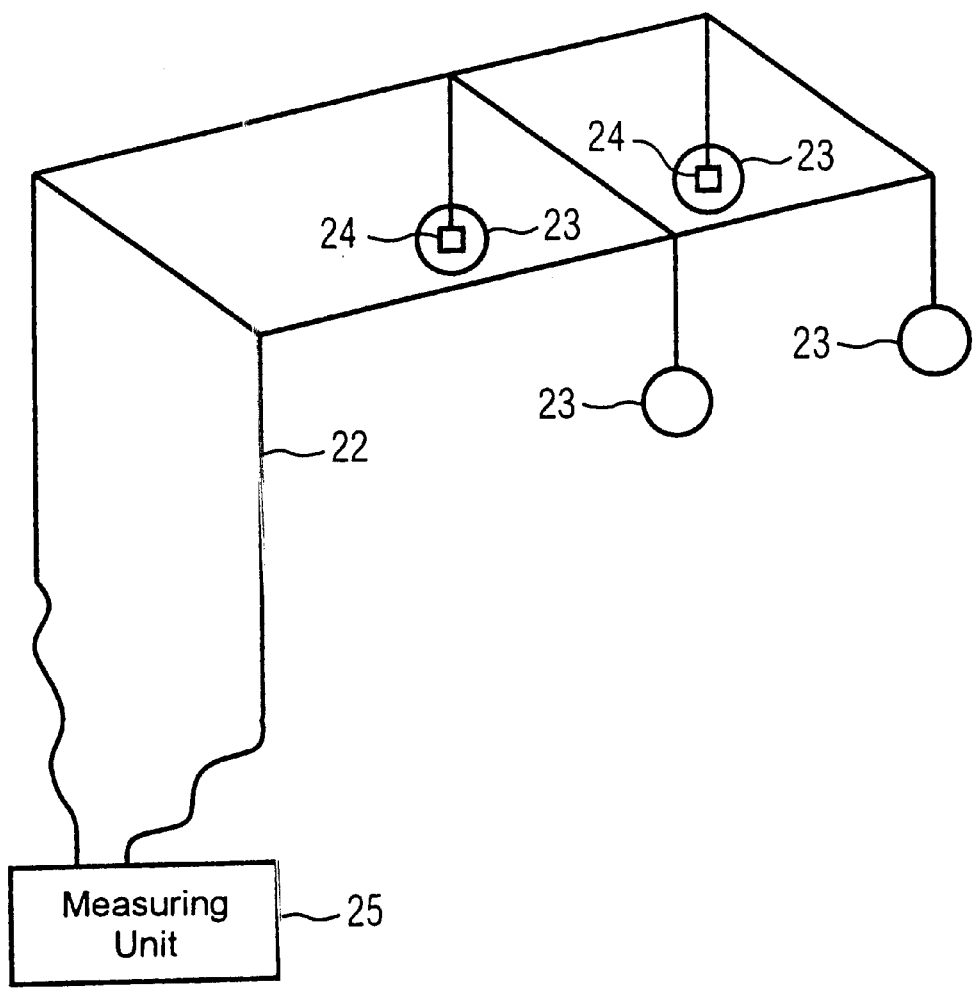
FIG. 6 is a diagram of a device for measuring a range of signals emitted by the individual antennas.

Instead of a transponder 7, a separate measuring device 21 may also be used, such as is illustrated in FIG. 6. The measuring device 21 may be used to set the transmit power of all the antennas 3–6 at the end of the production line when the vehicle is being manufactured. The measuring device 21 has a rack 22 on which four holders 23 are mounted. Disposed on the holders 23 are, in each case, either a transponder 7 or measuring heads 24 which measure the field strength of the electromagnetic field, emitted by the antennas 3, 4, 5, 6, in the vicinity of the measuring heads 24, and thus measure the reception strength. The measuring heads 24 that are respectively located on one side of the rack 22 are electrically connected to one another and to a measuring unit 25, such as a diagnostic unit, for example. The two front measuring heads 24 are also electrically connected to one another. The rack 22 has cable ducts in which cables are led from the measuring heads 24 to the measuring unit 25.

In order to set the transmit conditions, and in particular the transmit power and thus the range, the motor vehicle is driven into the measuring device 21 at the end of the production line when it is being manufactured, so that the holders 23 lie in the vicinity of the side windows or at a defined distance from them, outside the motor vehicle. Then, the initialization for setting the transmit conditions is started from the measuring unit 25, the antennas 3–6 being activated successively or even simultaneously so that they emit the interrogation signal.

The transmit power of the individual antennas 3–6, and thus the range of the interrogation signal, is then successively set in such a way that the measuring heads 24 detect just one field, or indeed no longer detect an adequate field. Likewise, the transmit power may be incrementally set in such a way that the field strength at the location of the measuring heads 24 just exceeds or undershoots a predefined threshold value.

The value of the transmit power which is determined is communicated to the transceiver unit 1 via a diagnostic interface. The transceiver unit 1 then stores the last transmit power which has been set, in the transmit memory 15. The initialization lasts only a few seconds. After this, the transmit conditions may be set for other transponders 7 or for another motor vehicle. The transmit conditions which are set in this way are then used, when the motor vehicle is operating, to carry out authentication.

On the basis of the received power measured by the measuring heads 24, and the transmit power which correlates with it, it is possible to calculate, with reference to values gained from experience with a known magnetic field distribution (known directional characteristic of the antenna), how the transmit conditions, and thus the transmit power of the antennas 3, 4, 5, 6, have to be set for a transponder 7 in the vicinity of the driver seat still to be capable of reliably receiving the interrogation signal. If the optimum transmit conditions are calculated with reference to measured values, just one or two interrogation signals have to be emitted in order to determine the transmit power. As a result, the anti-theft system can be initialized relatively quickly at the end of the production line.

The setting of the transmit conditions ensures that only that transponder 7 which is later located within the range of the interrogation signal is reliably addressed with the interrogation signal. Transponders 7 that are further away are thus not addressed. In addition, the electromagnetic field that is respectively generated by the antennas 3–6 is reduced to a minimum strength. The power that is required by the anti-theft system can thus be reduced to an absolutely necessary minimum. As a result, the electromagnetic interference that the anti-theft system causes to other equipment is reduced. The stressing of the user by an excessively large field is also reduced. Moreover, the functional reliability is ensured and a clear distinction is made between the passenger compartment and the area outside the vehicle, since the transmit power is set in such a way that, when the passenger compartment is detected, only an interrogation signal with appropriate strength is transmitted to a transponder 7 in the passenger compartment, and, when the area outside the vehicle is detected, only an interrogation signal with a limited range is transmitted into the area outside the vehicle.

In this way, the transmit power can be set in such a way that it is never too low either. This ensures that if possible the transponder 7 receives the interrogation signal when it is first emitted, as soon as the transponder 7 is located within the range of the interrogation signal. The user can also thus carry the transponder 7 anywhere on his person or store it anywhere in the interior of the vehicle without the interrogation/response dialog being restricted.

If the transmit power of the passenger compartment antenna 6 or of the door antennas 3 and 4 is tuned precisely in such a way that the interrogation signal extends just outside the side windows, the user is always sure that the transponder 7 in the passenger compartment is addressed by the interrogation signal. For detection of the area outside the vehicle, the antennas 3–5 are set in such a way that the interrogation signal is effective only in the area outside the vehicle, and that only the limited range is effective.

The interrogation signal contains an item of binary, coded information or a random number that is transmitted to the transponder 7 in modulated form. The interrogation signal is classified as having been correctly received only if the transponder 7 receives the complete item of information. The response signal also contains an item of binary, coded information that is transmitted in encrypted and modulated form to the transceiver unit 1 in the motor vehicle. This item of binary information can also have user-specific or vehicle-specific data. It may also contain the code of the transponder 7. Furthermore, it may contain control information, with reference to which the transceiver unit 1 detects which vehicle-mounted devices are to be controlled with the response signal.

In the transceiver unit 1 in the motor vehicle, the response signal is demodulated, decrypted and checked for its authentication. The binary information contained in it is evaluated and control signals are accordingly generated. However, the corresponding devices are controlled only if the binary information corresponds to the setpoint information stored in the setpoint value memory 14.

The setting of the transmit conditions is performed for all the antennas 3–6 so that the user can always get into his vehicle and start it even if the transponder 7 is located somewhere in the motor vehicle. The antennas 3–6 receive the response signal and pass it on to the transceiver unit 1, where it is checked for its authentication. If the response signal is authenticated, a central locking system is activated or an immobilizer of the motor vehicle is released. This enables the motor vehicle to be used, i.e. to be started and driven away.

One antenna can be disposed as an electrical coil in the vicinity of the ignition lock, in the vicinity of the vehicle door or the front seat passenger door, in the vehicle bodywork in the vicinity of the rear seat, of the fuel tank or of the bumpers or at other positions in the vehicle bodywork and on parts of the vehicle equipment, such as the seats. The transmit power of all the antennas 3, 4, 5, 6 is set at the end of the production line. If the range of the signals should change permanently owing to tolerances of the components, the transmit conditions may also be adjusted once more later in the same way in an authorized workshop or by the user while the motor vehicle is operating.

The setting of the transmit conditions at the end of the production line at a premise of the vehicle manufacturer has the advantage that later it is not necessary to emit the interrogation signal repeatedly when the anti-theft system is operating. In addition, the passenger compartment of the motor vehicle is covered by the set transmit power with a field from the passenger compartment antenna 6 without transmitting into the area outside the car. Overshoots of the passenger compartment antenna 6 are therefore avoided.

Figure 5:
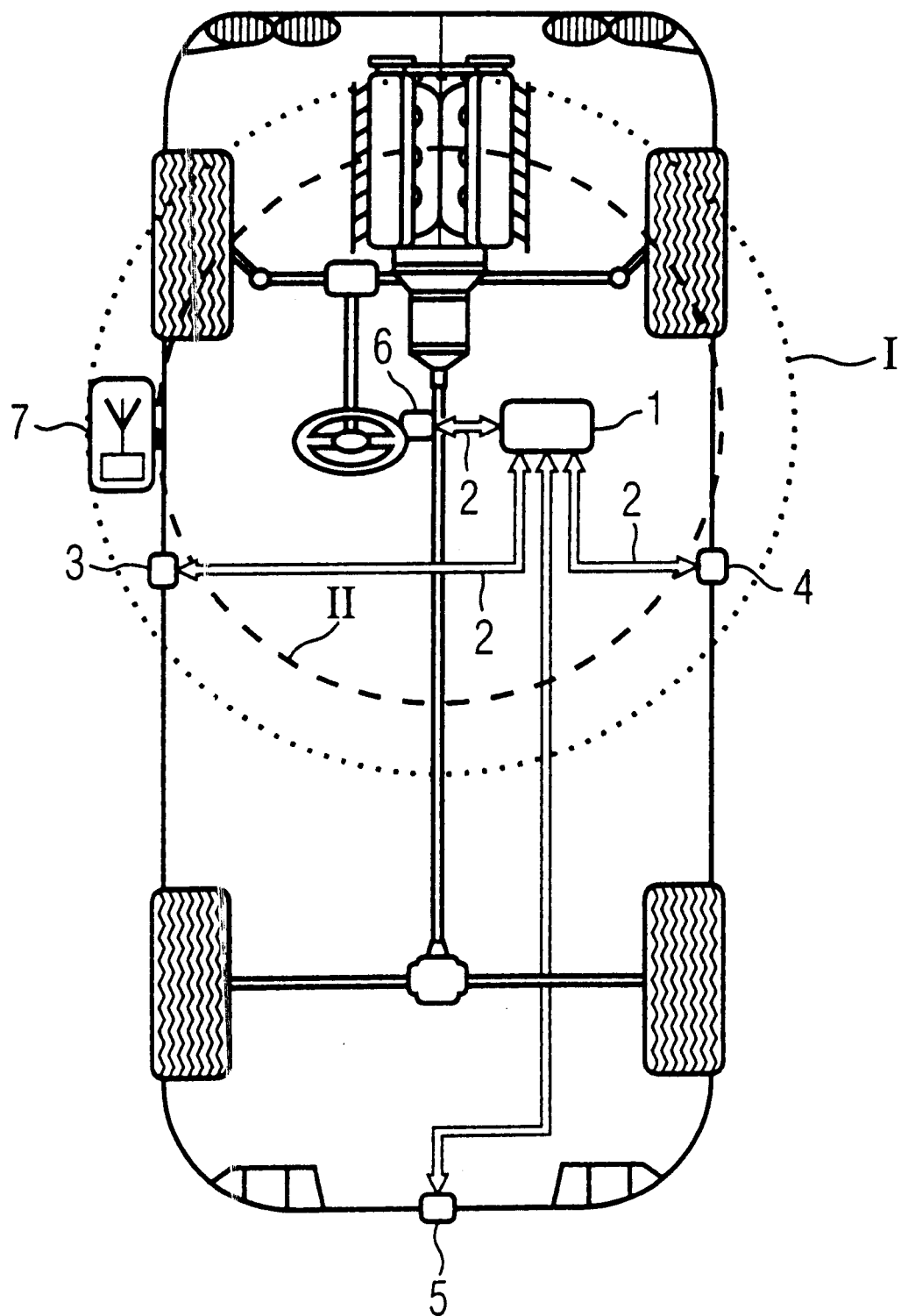
FIG. 5 is a block diagram showing a directional characteristic of an antenna of the anti-theft system.

The transmission characteristic or directional characteristic of the passenger compartment antenna 6 is illustrated in circular form in FIG. 5. Of course, this represents an idealized radiation characteristic which is not achieved with real antennas 3, 4, 5, 6 in a motor vehicle. The propagation of the electromagnetic field of the interior antenna is influenced by the bodywork of the motor vehicle and by other magnetically or electrically conductive parts, and is therefore of an even form. Since the initialization of the anti-theft system is carried out in the finished motor vehicle, the changes to the directional characteristic which are caused later by the presence of persons in the motor vehicle or by retrofitted objects are only of an insignificant degree. Consequently, once the transmit conditions have been set they are very largely valid even while the anti-theft system is operating, and are tailored to the anti-theft system.

We claim:

1. A method for initializing an anti-theft system, which comprises:
    a) setting an initial transmit condition;
    b) emitting an interrogation signal via a transceiver unit disposed in a motor vehicle and electrically connected to at least one antenna disposed on the motor vehicle;
    c) receiving the interrogation signal in a portable response transmitter located at a previously defined fixed position and emitting a response signal in response to the interrogation signal;
    d) receiving, evaluating, and comparing the response signal in a control unit of the transceiver unit with setpoint values;
    e) changing the initial transmit condition according to a predefined algorithm in dependence on the response signal received; and
    f) repeating steps b)–e) until the portable response transmitter just still receives the interrogation signal or just fails to receive the interrogation signal any more.

2. The method according to claim 1, which comprises storing determined transmit conditions as future transmit conditions in a transmit memory.

3. The method according to claim 1, which comprises using one of a transmit power, a transmit frequency and a phase of the interrogation signal as the initial transmit condition.

4. The method according to claim 1, which comprises:
    disposing a first antenna formed of electrical coils near an ignition lock;
    disposing a second antenna formed of electrical coils in a door of the motor;

disposing a third antenna formed of electrical coils in a vicinity of one of a side wall near a rear seat, a fuel tank a bumper, and a body panel of the motor vehicle; and emitting the interrogation signal with each of the first antenna, the second antenna, and the third antenna.

5. The method according to claim 1, which comprises changing the initial transmit condition incrementally within a predefined range.

6. The method according to claim 1, which comprises changing the initial transmit condition continuously within a predefined range.

7. The method according to claim 1, which comprises providing and transmitting via a plurality of portable response transmitters a unique response code based on unique transmit conditions associated with each of the plurality of portable response transmitters.

8. The method according to claim 1, which comprises:

measuring a power of the interrogation signal via a measuring device of the portable response transmitter; and transmitting via the portable response transmitter a measured power value to the transceiver unit disposed in the motor vehicle.

9. An anti-theft system, comprising:

at least one antenna disposed in a motor vehicle;

a transceiver unit disposed in the motor vehicle and electrically connected to said at least one antenna, said transceiver unit emitting via said at least one antenna an interrogation signal;

a portable response transmitter receiving the interrogation signal and responding by emitting a response signal; and said portable response transmitter just still receives the interrogation signal or just fails to receive the interrogation signal any more;

said transceiver having a control unit for receiving, evaluating and comparing the response signal with setpoint values, said transceiver also having a transmit memory connected to said control unit for storing predetermined transmit conditions determined during an initialization phase.

* * * * *